United States Patent [19]
Sugikawa

[11] Patent Number: 6,080,357
[45] Date of Patent: Jun. 27, 2000

[54] METHOD OF MANUFACTURING POROUS SHEET, POROUS METAL SHEET MANUFACTURED BY METHOD, AND ELECTRODE FOR BATTERY

[75] Inventor: Hirofumi Sugikawa, Toyonaka, Japan

[73] Assignee: Katayama Special Industries, Ltd., Osaka-Fu, Japan

[21] Appl. No.: 09/038,130

[22] Filed: Mar. 11, 1998

[30] Foreign Application Priority Data

Mar. 11, 1997 [JP] Japan ................................. 9-056729

[51] Int. Cl.⁷ ........................................................ B22F 1/04

[52] U.S. Cl. ...................................................... 419/2; 419/9

[58] Field of Search ........................... 419/2, 9; 264/46.6

[56] References Cited

U.S. PATENT DOCUMENTS 2,290,338  7/1942  Koehring .
2,350,179  5/1944  Marvin .
3,174,219  3/1965  Horn et al. .

*Primary Examiner*—Ngoclan Mai
*Attorney, Agent, or Firm*—Sughrue, Mion, Zinn, Macpeak & Seas, PLLC

[57] ABSTRACT

Metal powders are spread on a feeding belt or a supporting sheet which is continuously fed; the feeding belt or the supporting sheet on which the metal powders have been spread is passed through a sintering oven; and the metal powders are sintered, with adjacent uncompressed metal powders in contact with each other partly and gaps present therebetween. Consequently, contact portions of the metal powders are integrated with each other and the gaps are formed as fine pores.

16 Claims, 10 Drawing Sheets

FIG. 13(A) FIG. 13(B)
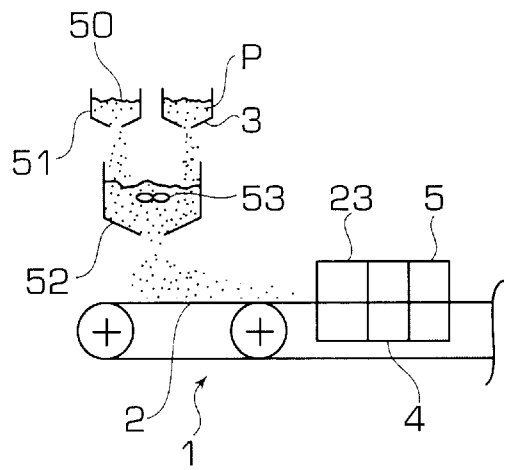
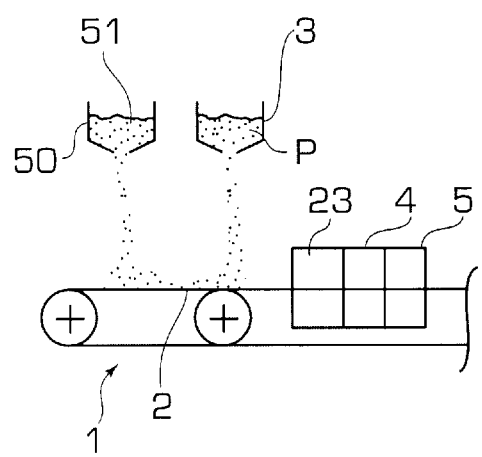
FIG. 14
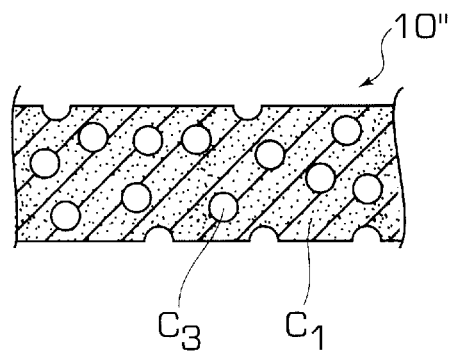

METHOD OF MANUFACTURING POROUS SHEET, POROUS METAL SHEET MANUFACTURED BY METHOD, AND ELECTRODE FOR BATTERY

BACKGROUND OF THE INVENTION

1. Field of the Invention

The present invention relates to a method of manufacturing a porous metal sheet which is preferably used as an electrode substrate of a battery; the porous metal sheet manufactured by the manufacturing method; and an electrode for a battery using the porous metal sheet. More particularly, the present invention relates to a porous sheet formed of metal powders so that an active substance is filled into pores thereof. The porous metal sheet is preferably used as the electrode substrate of a nickel hydrogen battery, a nickel cadmium battery, a lithium primary battery, a lithium secondary battery, an alkali dry cell, a fuel cell and so on; and an electrode plate of various batteries, for example a battery for vehicles.

2. Description of the Related Art

As porous metal sheets of this type which are used as the electrode substrate of batteries, the present applicant proposed various kinds of metal porous materials made of a foamed material, a nonwoven sheet, a mesh material, a laminated sheet comprising two or more thereof by treating these materials so that they are electrically conductive and then electroplating them.

In manufacturing the porous metal sheet by the method, it is necessary to perform an electric conductive treatment by a method such as vaporizing method, chemical plating method or carbon application method as a pre-treatment of electric plating. It is troublesome and costly to carry out these methods. Further, when the foamed material, the nonwoven sheet, the mesh material are electroplated and burnt to remove resinous material and metal powders are sintered, burnt-off portions are cavitied. Thus, an active substance cannot be filled thereinto.

In view of the problems, the present applicant proposed many methods of manufacturing the porous metal sheet from metal powders.

In any of the above-described methods, using adhesive agent, fine metal powders are applied to entire surfaces including the inner surfaces of pores of the foamed material, the nonwoven sheet, the mesh material or the laminated sheets thereof so as to form a conductive metal layer thereon. Then, the resinous material is removed and the metal powders are sintered to form porous metal sheets.

In the above-described conventional methods of forming the porous metal sheet, using fine metal powders, fine metal powders are applied to the surface of the porous base plate such as the foamed material, the nonwoven sheet, the mesh material, or the laminated sheets thereof. Thus, the size and shape of the pore of the porous metal sheet is restricted by the size and shape of the pore of the porous base plate. Thus it is difficult to form a pore smaller or greater than the pore of the porous base plate and a pore whose shape is different from that of the pore of the porous base plate.

As one of the conditions required as the substrate of the electrode plate, it is necessary that the porous metal sheet is thin to accommodate a large amount of an active substance so as to improve the performance of a battery. But in the above-described conventional methods of forming the porous metal sheet, using fine metal powders, the thickness of a porous metal sheet is restricted by the thickness of the base plate. Hence it is difficult to manufacture a porous metal sheet having a thickness 1 mm or less.

Further, adhesive agent is used in any of the above-described conventional methods. That is, fine metal powders are applied to the base plate by mixing them with the adhesive agent or after the adhesive agent is applied to the base plate. Therefore, the adhesive agent is present between adjacent fine metal powders. Thus when the adhesive agent is burnt off, together with the base plate during the removal of the resinous material and the sintering of the fine metal powders, large gaps are formed between the adjacent fine metal powders. As such, it is difficult to control the shape and size of the pore. In addition, the number of processes is increased because the adhesive agent is used.

Further, a solid metal foil is hitherto used as the substrate of the positive and negative electrodes of a lithium secondary battery. In this case, lithium ions are incapable of moving from the front surface of the electrode substrate to the rear surface thereof and from the rear surface thereof to the front surface. Therefore, in order to obtain a possible most uniform and thinnest active substance layer, the active substance is required to be applied to one surface of each of the positive and negative electrodes. In addition, because the surface of the substrate is smooth, the active substance is liable to be separated from the base plate.

In porous metal sheet having punching shape, lath-shape, mesh-shape, foamed sheet-shape, nonwoven sheet-shape and so on, lithium ions are capable of moving from the front surface of the electrode substrate to the rear surface thereof and vice versa and further, the thickness of the active substance can be controlled at both the front and rear surfaces of the electrode substrate by the porous metal sheets. Thus, research and development are being made to use such the porous metal sheets as the electrode substrate of the lithium secondary battery. But the size of the solid portion of the conventional porous metal sheet and the size of the pore thereof are not uniform. Therefore, the lithium ions are incapable of moving uniformly and sufficiently. Although it is preferable that the porous metal sheet has a large number of small pores thereon to allow the lithium ions to move smoothly, the porous metal sheet which satisfy such a demand has not been proposed.

The electrode substrate of the lithium secondary battery is required to have a thickness of 10 $\mu$m–30 $\mu$m. But as described above, it is difficult for the conventional art to manufacture a porous metal sheet having a thickness 1 mm or less. That is, it is impossible to manufacture a porous metal sheet whose thickness is as small as a thin foil.

In recent years, portable equipment such as a video camera, a liquid crystal compact television, a CD player, and the like requiring high current have come into wide use. Thus, there is a growing demand for the development of batteries having a great discharge capacity and superior in discharge characteristic in a high load-applied state. But in the conventional alkali dry cell having a separator, pellets having positive electrode is filled outside the separator and gel powdered zinc is filled inside the separator. As such, it is very difficult for the alkali dry cell to have a great discharge capacity and have an improved discharge characteristic in a high load-applied state because the battery can has a limited space.

In order to solve the problem, researches are made on an alkali dry cell whose negative electrode plate consists of a punching or expanding solid zinc foil or zinc foil and positive electrode plate consists of metal oxide. The negative electrode plate and the positive electrode plate are spirally coiled with a separator interposed to increase the area of the negative electrode plate and the positive electrode plate and the discharge capacity of the battery and improve the discharge performance thereof in a high load-applied state. But the punching or expanding zinc foil has a problem that the open area ratio is about 50% or less because pores are two-dimensional; pore-forming processing is carried out and thus a pore-formed portion is cut off, and hence material left parts of material are much; processing and material costs become high as the thickness of the zinc foil is increasingly thin; and strain and burr are liable to appear in the pore-forming process. Further, the solid zinc foil and the conventional porous metal sheet have problems similar to those of the lithium secondary battery.

Further, conventionally, the electrode of alkali secondary batteries such as the nickel hydrogen battery and the nickel cadmium battery is formed as follows; paste-like slurry of an active substance formed by mixing an active substance such as hydrogen-storing alloy powder or powder of nickel hydroxide and electrically conductive agent comprising carbon, binder and so on is applied to a collector such as punching metal, metal mesh, expanded metal. But the binder prevents flow of electric current, thus making the electricity-collecting property in the thickness direction of the electrode worse.

SUMMARY OF THE INVENTION

The present invention has been developed to solve the problems and to improve a manufacturing method of a porous metal sheet made from metal powders. It is an object of the present invention to provide a porous metal sheet-manufacturing method capable of controlling the thickness thereof, the size of pores, the shape thereof as desired and eliminating the use of adhesive agent so as to manufacture the porous metal sheet in a simple process; and the porous metal sheet which is manufactured by the method.

It is another object of the present invention to provide an electrode which comprises a metal sheet into which a binder-unadded active substance consisting of powders can be charged and is superior in electricity-collecting performance.

In order to solve the problems, there is provided a method of manufacturing a porous metal sheet comprising the steps of:

spreading metal powders on a feeding belt which is continuously fed;

passing the feeding belt on which the metal powders have been spread through a sintering oven; and sintering the metal powders, with adjacent uncompressed metal powders in contact with each other partly and gaps present therebetween so as to integrate contact portions of the metal powders with each other and form the gaps as fine pores.

The feeding belt comprises a solid metal sheet, an inorganic sheet including a porous metal sheet; or a laminated sheet of the solid metal sheet and the inorganic sheet including a porous metal sheet of a circulating driving device of belt conveyor type. For example, the feeding belt is SUS (310S). Metal powders spread on the feeding belt can be separated therefrom by sintering them to form into a sheet. That is, the metal powders can be formed into a porous metal sheet continuously with high efficiency by passing the feeding belt being continuously fed through the sintering oven.

As described above, because the metal powders spread on the feeding belt are kept uncompressed, spherical surfaces of adjacent metal powders are not in contact with each other but in a dot contact state or in a line contact state, and thus gaps are present between the adjacent metal powders. When they are heated in this state at a required temperature in a sintering oven, contact portions of the adjacent metal powders are integrated with each other. As a result, the gaps between the metal powders are formed as fine pores and thus a porous metal sheet can be continuously formed.

Accordingly, the size of a pore depends on the size of a metal powder. That is, a large pore is formed when the diameter of the metal powder is large, whereas a small pore is formed when the diameter of the metal powder is small. The metal powder having a diameter in a range of 0.1 $\mu$m–100 $\mu$m is preferably used.

Metals which are used as the material of the porous metal sheet are not limited to specific kinds. The following substances are preferably used: Ni, Cu, Al, Ag, Fe, Zn, In, Ti, Pb, V, Cr, Co, Sn, Au, Sb, C, Ca, Mo, P, W, Rh, Mn, B, Si, Ge, Se, La, Ga and Ir. Each metal described above is used in the form of oxide and sulfide thereof and a simple substance or a mixture, including compounds of these metals. That is, Al, Ti and V which cannot be used in electroplating can be used. It is possible to use one kind of metal selected from these metals in the form of powders or a mixture of a plurality of these metals in the form of metal powders. It is desirable that metal powders of these metals do not intertwine with one another and are dispersed favorably. That is, the peripheral surfaces of the metal powders are desired not to be convex or concave so that they do not intertwine one another. Thus, it is preferable that the metal powders are spherical, dice-shaped, square pillar and columnar.

Because the feeding belt is porous, metal powders spread thereon drop from the pores of the feeding belt. Consequently, through-holes are formed on the resulting porous metal sheet. The through-holes are larger than pores consisting of small gaps present between the metal powders. As such, the resulting porous metal sheet has the large through-holes and the fine pores. Metal powders which have dropped from the pores of the feeding belt are collected to recycle them.

Further, there is provided a method of manufacturing a porous metal sheet comprising the steps of feeding a supporting sheet continuously; spreading metal powders on the supporting sheet; feeding the supporting sheet on which the metal powders have been spread on a feeding belt; and passing the supporting sheet through a sintering oven, together with the feeding belt; and sintering the metal powders on the supporting sheet, with adjacent uncompressed metal powders in contact with each other partly and gaps present therebetween so as to integrate contact portions of the metal powders with each other and form the gaps as fine pores.

The supporting sheet comprises an organic sheet including a solid resinous sheet, a three-dimensional reticulate resinous sheet and a porous fibrous resinous sheet, an inorganic sheet including a solid metal sheet and a porous metal sheet or a laminated sheet composed of a plurality of sheets selected from the sheets.

Because the supporting sheet is used, the resulting porous metal sheet can be separated from the feeding belt more easily than the porous metal sheet formed on the feeding belt by directly spreading metal powders thereon. A resinous sheet used as the supporting sheet is burnt off in a resinous material-removing oven. An inorganic sheet such as a metal sheet is not removed by heating. Some inorganic sheets are separated from the resulting porous metal sheet, whereas some inorganic sheets are not separated therefrom but fed downstream, together with the feeding belt and wound around a roll. The supporting sheet formed of a thin metal plate can be fed at a high speed and thus a high productivity can be obtained.

When a sheet having a large number of holes is used as the supporting sheet, as same as the case of the feeding belt, it is possible to manufacture a porous metal sheet having fine pores surrounded with the metal powders and large through-holes formed in portions corresponding to the holes of the sheet used as the supporting sheet.

The feeding belt or the supporting sheet on which the metal powders have been spread is passed through a cooling oven positioned subsequently to the sintering oven to cool the metal powders after the metal powders are sintered.

Preferably, after the metal powders are sintered and cooled, the resulting porous metal sheet is passed between a pair of rolling rollers to increase an area of integrated portions of the metal powders with each other so as to increase the strength of the porous metal sheet.

Preferably, the sintering, the cooling, and the rolling are repeated at a plurality of times.

Further after the metal powders are sintered, cooled, and rolled, the resulting porous metal sheet is preferably separated from the feeding belt or the supporting sheet.

That is, it is possible to use the porous metal sheet formed by sintering metal powders as an electrode substrate. When the porous metal sheet does not have a desired strength because pores thereof are large and the area of integrated portions of the metal powders is small, the area of integrated portions thereof can be increased by rolling the obtained porous metal sheet lightly. If a great force is applied to the porous metal sheet at a time, it may be meandered or cracked. Therefore, it is preferable that the porous metal sheet is rolled at a small rolling coefficient at a plurality of times.

Preferably, metal powders are spread again on a surface of the porous metal sheet formed by the sintering and sintered so that the thickness of the porous metal sheet is increased to a required one and the tensile strength thereof is improved.

Further, preferably, after the metal powders are spread on the feeding belt or the supporting sheet, the metal powders are pressed at a required small pressure by a pressing roller, and then, the metal powders are passed through the sintering oven to sinter the metal powders.

The pressing roller is used not to compress the metal powders but increase the contact area thereof. The metal powders can be integrated with one another in a great area and the strength of the porous metal sheet can be enhanced by sintering it after pressing it lightly by the pressing roller.

Furthermore, the supporting sheet is preferably burnt off in a resinous material-removing oven.

The supporting sheet may not be burnt off in the resinous material-removing oven but the supporting sheet and the porous metal sheet formed of the metal powders may be laminated one on the other. That is, a porous metal sheet having a laminated structure. Using various kinds of supporting sheets selectively, it is possible to manufacture porous metal sheets of various forms by forming the laminated structure.

Metal sheets listed below may be used as the supporting sheet to laminate the porous metal sheet formed of metal powders one on the other to form the laminated structure.

Further, after forming a porous metal sheet of metal powders, the porous metal sheet and the metal sheets list below are laminated one on the other and integrated with each other to manufacture a porous metal sheet having the laminated structure.

The metal sheets include a solid metal plate or a solid metal foil; a metal plate or foil having a large number of pores formed thereon; a metal mesh; a metal screen or/and three-dimensional reticulate foamed sheet; a porous fibrous resinous sheet; a mesh sheet or a porous metal sheet comprising a laminated sheet of these sheets; the porous metal sheet formed by removing a resinous material and sintering after plating the laminated sheet with a metal, evaporating a metal thereon, applying fine metal powders or spraying a metal thereto; a porous metal sheet formed of metal fibers; a porous metal sheet made of metal powders rolled by a pair of rolling rollers, at least one of which serves as a pattern roller; and a laminated sheet comprising these sheets laminated one on the other and integrated with each other.

It is possible to laminate the porous metal sheet manufactured by the method of the present invention; a metal plate or foil having a large number of pores formed thereon; a metal mesh; a metal screen; a three-dimensional reticulate foamed sheet or a nonwoven sheet-shaped porous metal sheet on both surfaces of the porous metal sheet manufactured by the method of the present invention by differentiating the size of pores of the porous metal sheet positioned on one surface of the laminated sheet and that of pores of the porous metal sheet positioned on the other surface thereof and differentiating the open area ratio or/and the diameter of the porous metal sheet.

A sheet having convexes and concaves formed alternately with each other is used as the feeding belt or the supporting sheet, so that metal powders which have been spread on the convexes are dropped to the concaves by vibrating the metal powders or by a scraping means and then sintered in a sintering oven so as to form fine pores between the adjacent metal powders and pores consisting of large through-holes corresponding to the convexes.

Because concaves and convexes are formed on the feeding belt and the supporting sheet on which metal powders are spread, the metal powders drop from the convexes to the concaves and accumulate in the concaves. Metal powders accumulated on the surfaces of the convexes are dropped to the concaves by vibrating the feeding belt or the supporting sheet. When the metal powders dropped to the concaves are sintered, a porous metal sheet is obtained, with the metal powders integrated with each other partly and pores present among the metal powders. Therefore, as in the case of the supporting sheet having holes formed thereon, the porous metal sheet thus manufactured has fine pores and comparatively large through-holes.

Pores of a porous sheet which is used as the feeding belt and the supporting sheet and the convexes are random shapes such as circular, rhombic, polygonal or elliptic. The pores and the convexes are preferably formed lengthwise and widthwise at predetermined intervals.

Because the pores or the convexes are formed on the feeding belt and the supporting sheet, a porous metal sheet having through-holes corresponding to the pores or the convexes is formed. If the pores or the convexes are circular, the formed porous metal sheet has hole-shaped pores. If the pores or the convexes are rhombic, pores of the formed porous metal sheet are lath-shaped.

A sublimable fine fragment which is burnt off by heating is mixed with the metal powders or spread on the feeding belt or the supporting sheet before the metal powders are spread thereon, and the sublimable fine fragment are burnt off in a resinous material-removing oven to form fine pores between the adjacent metal powders and large pores formed in portions where the sublimable fine fragment has been present.

When some agent such as foaming agent generating gas when it is heated is used as the sublimable fine fragment, a resulting porous metal sheet has through-holes formed by the generated gas. Further, the size of the through-holes can be controlled according to the diameter of particles of the sublimable fine fragment.

Further, in the present invention there is provided a porous metal sheet manufactured by the method in above-mentioned.

The porous metal sheet formed by using the sublimable fine fragment or/and the feeding belt and the supporting sheet consisting of a porous sheet or a material having convexes and concaves formed alternately with each other, is punching shape, reticulate shape, honeycomb-shape, lath-shape, lattice-shape, expanded sheet-shape, screen-shape or lace-shape. That is, a porous metal sheet having a desired shape can be manufactured according to the shape of the sublimable fine fragment, the shape of the pore of a porous sheet, the shape of the convex.

The porous metal sheet has preferably pore-unformed lead portions spaced at predetermined intervals.

Further, in the present invention, there is provided a substrate for a battery electrode comprising the porous metal sheet formed by the above method.

Further, in the present invention, there is provided an electrode for a battery in which an active substance is charged into a pore of the substrate for a battery electrode, and an active substance layer is formed on at least one surface of the substrate for a battery electrode.

As the active substance, the following substances can be used: metals such as zinc, lead, iron, cadmium, aluminum, lithium, and the like; metal hydroxides such as nickel hydroxide, zinc hydroxide, aluminum hydroxide, iron hydroxide, and the like; complex oxides such as lithium dimanganese tetraoxide, lithium cobalt dioxide, lithium nickel dioxide, lithium divanadium tetraoxide and the like; metal oxides such as manganese dioxide, lead dioxide, and the like; electrically conductive polymers such as polyaniline, polyacethylene, and the like; hydrogen-storing alloy; carbon; and other substances. The kind is not limited.

Conventionally, when the active substance is charged into a substrate for a battery electrode, an electrically conductive material such as carbon powders and binder are added to the active substance. But according to the present invention, the active substance is used without adding the binder thereto. The porous metal sheet of the present invention has fine pores into which powders of the active substance can be charged without binding them by the binder. In particular, when a pore has a three-dimensional structure, powders of the active substance can be held at a high strength and thus can be reliably held without being dropped from the porous metal sheet. The electricity-collecting performance of the electrode can be outstandingly enhanced by not adding the binder to the active substance.

In the case of the negative electrode of a nickel hydrogen battery, powders containing hydrogen-storing alloy as the main component is used as the active substance. The active substance consists of hydrogen-storing alloy powder or mixture of the hydrogen-storing alloy powder and a transition metal. Further, it is preferable that a surface of the active substance layer is covered partly or entirely with the transition metal.

It is preferable that an active substance containing hydrogen-storing alloy as a main component is successively supplied at a required pressure to a porous metal sheet successively formed by the method at above-mentioned to fill pores of the porous metal sheet with the active substance, and an active substance layer having a required thickness is formed on at least one surface of the porous metal sheet. That is, the electrode can be successively manufactured by successively supplying powders of the active substance to the porous metal sheet at a required pressure after the process of forming metal powders into the porous metal sheet which constitutes an electrode substrate finishes.

Further, in the present invention, there is provided a battery comprising the electrode for a battery. As the battery, a nickel hydrogen battery, a nickel cadmium battery, a lithium primary battery, a lithium secondary battery, an alkali dry cell, a fuel cell; and a battery for vehicles are exemplified.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 12 (B) is a plan view showing a porous metal sheet which is formed by the method of the fourth embodiment;

FIGS. 13 (A) and (B) are schematic views showing an apparatus for carrying out by the method of a fifth embodiment of the present invention;

FIG. 14 is a schematic sectional view showing a porous metal sheet which is manufactured by the method of the fifth embodiment;

DESCRIPTION OF THE PREFERRED EMBODIMENTS

The embodiments of the present invention will be described below in detail with reference to drawings.

Figure 1:
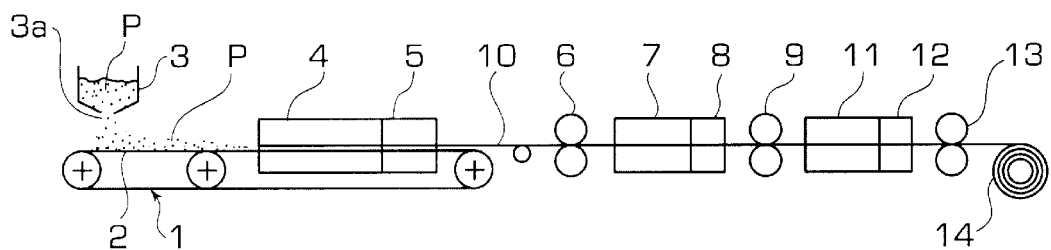
FIG. 1 is a schematic view showing an apparatus for carrying out the method of a first embodiment of the present invention.

FIG. 1 shows an apparatus for carrying out the manufacturing method of the first embodiment. The circulating driving device 1 of belt conveyer type comprises an endless feeding belt 2, a storing hopper 3, for storing metal powders P, positioned over the feeding belt 2 and at the upstream side thereof; a sintering oven 4; and a cooling oven 5 both positioned at the downstream side thereof. The feeding belt 2 is SUS (310S) which is flexible. An unshown metering controller is installed on a discharge opening 3a positioned at the lower end of the storing hopper 3 so that the metal powders P can be spread on the upper surface of the feeding belt 2 at a required density and thickness. The metal powders P have diameters in the range of 0.1 μm–100 μm and are preferably, spherical, flake-shaped or spike-shaped.

Figure 2:
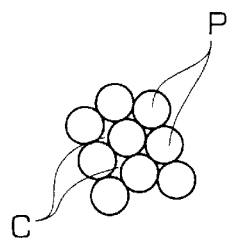
FIG. 2 is a schematic enlarged view showing a state of spread metal powders.

As described above, because the metal powders P spread on the feeding belt 2 are in an uncompressed state, as shown in FIG. 2, entire surfaces of adjacent metal powders are not in contact with each other, but partly in contact with each other. More specifically, they are in a dot contact state or in a line contact state, thus forming pores C (gaps) between the adjacent metal powders P.

In this state, together with the feeding belt 2, the metal powders P are passed through into the sintering oven 4 to sinter them by heating them at a required temperature. As a result, contact portions of the adjacent metal powders P are fused together. Because the gaps (C) are still present, the pores (C) are present among the metal powders P integrated with each other to form a fine porous structure. In this manner, a porous metal sheet 10 is continuously formed. As described above, after the porous metal sheet 10 is obtained by sintering the metal powders P in the sintering oven 4, it is cooled in the cooling oven 5 at a required temperature.

The porous metal sheet 10 obtained as described above by sintering the metal powders P in the sintering oven 4 may be used as the electrode plate of a battery. If a required strength cannot be obtained because the pore (C) is great and the area of the integrated portions of the adjacent metal powders P is small, the porous metal sheet 10 is separated from the feeding belt 2 and passed between a pair of rolling rollers 6 to roll it lightly as shown in FIG. 1. Consequently, the area of the integrated portions of the adjacent metal powders P is increased.

After the porous metal sheet 10 is passed between the rolling rollers 6 to increase the area of contact of the integrated portions of the metal powders P, it is passed through a second sintering oven 7 to fuse the contact portions of the metal powders P together, and then, cooled by a second cooling oven 8.

When a great pressure is applied to the porous metal sheet 10 at a time when it is rolled, it may be damaged, cut or zigzag. Thus, the porous metal sheet 10 is rolled at a plurality of times. That is, after the porous metal sheet 10 is passed between the second cooling oven 8, it is rolled again by a pair of second rolling rollers 9 to increase the area of contact portion of the metal powders P. Then, the porous metal sheet 10 is passed between a third sintering oven 11 and a third cooling oven 12, and then passed between a pair of skin pass rollers 13 to temper it. Finally, the porous metal sheet 10 is wound around a roller as a coil 14.

Experiment 1

Flat copper powders whose average diameter was 40 μm obtained by electrolysis were spread on the feeding belt 2 from the hopper 3 at a rate of 135 g/m². The copper powders were sintered in a non-oxidizing atmosphere in the sintering oven 4 at 600° C.–950° C. At this time, the copper powders contracted at about 7% in the width direction of a resulting porous metal sheet 10. Then, it was cooled to 50° C. in the cooling oven 5. When it was discharged from the cooling oven 5, it was separated from the feeding belt 2.

Then, the porous metal sheet 10 was rolled by the rolling roller 6. The obtained porous sheet of copper was 22 μm in thickness; 26% in open area ratio; 145 g/m² in weight; 1.5 kgf/20 mm in tensile strength.

Then, the porous metal sheet was sintered in a non-oxidizing atmosphere in the second sintering oven 7 at 950° C. and then cooled in the second cooling oven 8. After it was rolled again in the second rolling roller 9, it was sintered at 950° C. in a non-oxidizing atmosphere in the third sintering oven 11 and then cooled by the third cooling oven 12. Thereafter, it was passed between the skin pass roller 13 to temper it.

The porous metal sheet 10 obtained as the end product was 18 μm in thickness; 16% in open area ratio; 134 g/m² in weight; 2.8 kgf/20 mm in tensile strength. By repeating rolling and sintering at a plurality of times as described above, the porous mnetal sheet having a firm connection between the metal powders and thus a high tensile strength was obtained.

Figure 3:
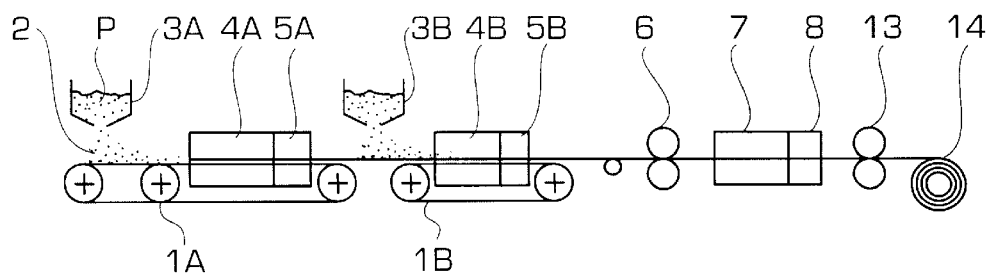
FIG. 3 is a schematic view showing an apparatus of a modification of the first embodiment.
Figure 4:
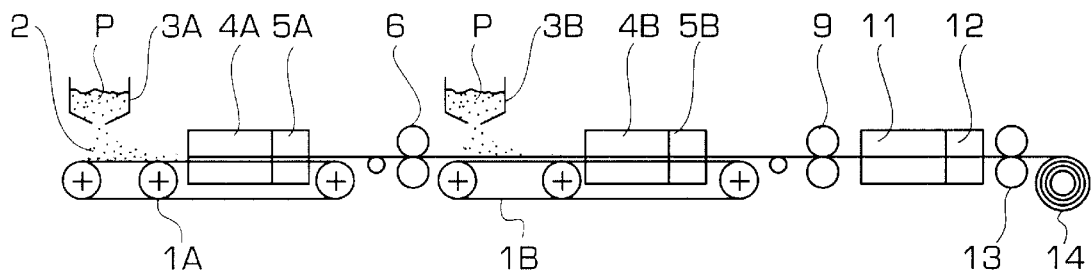
FIG. 4 is a schematic view showing an apparatus of another modification of the first embodiment.

FIGS. 3 and 4 show a modification of the first embodiment, respectively. In the modification shown in FIG. 3, the circulating driving device 1 of belt conveyor type has a long belt conveyor. After the metal powders P were spread on the feeding belt 2 from a first hopper 3A, a porous metal sheet was formed by passing the metal powders through into a first sintering oven 4A and a first cooling oven 5A, and then, the metal powders P were spread on the porous metal sheet from a second hopper 3B and sintered in a second sintering oven 4B and cooled in a second cooling oven 5B. In this manner, the porous metal sheet 10 having a great thickness was obtained by repeating spreading and rolling/sintering at a plurality of times.

As described above, after repeating spreading and sintering/cooling of the metal powders P at a plurality of times on the feeding belt 2, the porous metal sheet 10 is separated from the feeding belt 2 and passed between the rolling roller 6, similarly to the first embodiment, and then, sintered again in the sintering oven 7 and cooled again in the cooling oven 8 to increase the strength thereof. Finally, the porous metal sheet 10 is wound around a roller as a coil 14.

In the modification shown in FIG. 4, the metal powders P are spread on the feeding belt 2 of the circulating driving device 1 of belt conveyor type from the first hopper 3A. After the porous metal sheet 10 formed by heating the metal powders P in the first sintering oven 4A and cooling them in the first cooling oven 5A is separated from the feeding belt 2, it is rolled by the rolling roller 6. Then, the porous metal sheet 10 is placed on the feeding belt 2 of a second circulating driving device 1B of belt conveyor type again. Then, the metal powders P are spread over it from the second hopper 3B and introduced into the second sintering oven 4B and the second cooling oven 5B. The thickness of the porous metal sheet can be increased by the method. After the porous metal sheet 10 is discharged from the second cooling oven 5B, it is separated from the feeding belt 2 of the second circulating driving device 1B, and is then passed between a pair of the rolling rollers 9. After the porous metal sheet 10 is introduced into the third sintering oven 11 and the third cooling oven 12 and passed between the skin pass roller 13, it is wound around a roller as the coil 14. That is, the porous metal sheet 10 having a large thickness and a high strength can be obtained by repeating the spread of the metal powder sintering and cooling thereof rolling thereof.

Figure 5:
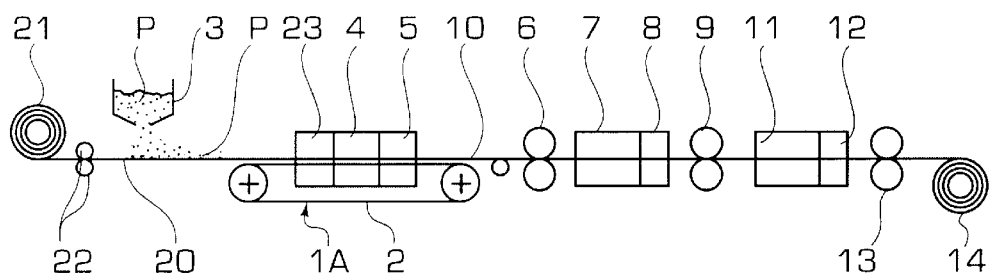
FIG. 5 is a schematic view showing an apparatus for carrying out the method of a second embodiment of the present invention.

FIG. 5 is a schematic view showing an apparatus for carrying out the method of the second embodiment of the present invention. In the second embodiment, metal powders P are not directly spread over the feeding belt 2 of the circulating driving device 1, but a supporting sheet 20 is continuously unwound from a coil 21 and fed downstream to the upper surface of the feeding belt 2 by the guidance of a guide roller 22. In a region at the upstream side of the circulating driving device 1, the metal powders P are spread over the supporting sheet 2 from a hopper 3.

The supporting sheet 20 on which the metal powders P have been spread is fed to a resinous material-removing oven 23, the sintering oven 4, and the cooling oven 5 sequentially, with the supporting sheet 20 placed on the feeding belt 2. The supporting sheet 20 is burnt off in the resinous material-removing oven 23; then, the metal powders P are sintered in the sintering oven 4 to form the porous metal sheet 10; and then, the porous metal sheet 10 thus formed is cooled in the cooling oven 5.

Similarly to the first embodiment, when the porous metal sheet 10 is discharged from the cooling oven 5, it is separated from the feeding belt 2 and then, passed between a pair of the rolling rollers 6 to roll the porous metal sheet 10. Then, the porous metal sheet 10 is fed to the second sintering oven 7, the second cooling oven 8, the second rolling roller 9, the third sintering oven 11, the third cooling oven 12, and the skin pass roller 13. Finally, it is wound around a roller as the coil 14.

Figure 6:
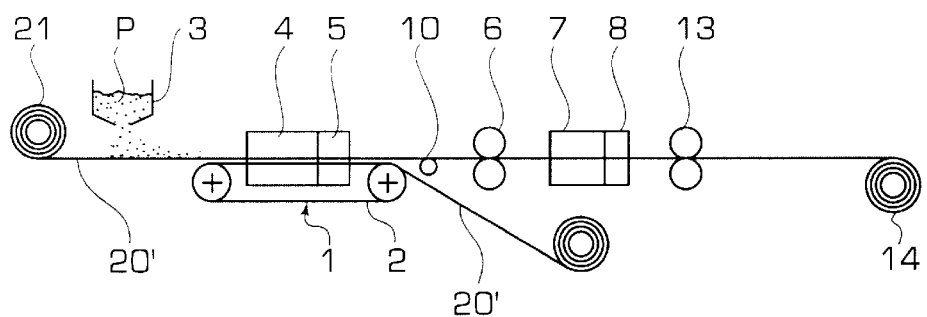
FIG. 6 is a schematic view showing an apparatus of a modification of the second embodiment.

FIG. 6 is a schematic view showing an apparatus carrying out the method of a modification of the second embodiment. In the modification, as the supporting sheet, an inorganic supporting sheet 20' which is not removed by heating in the sintering oven is used. In using the inorganic supporting sheet 20', the porous metal sheet 10 is separated from the supporting sheet 20' when the supporting sheet 20' is separated from the feeding belt 2 of the circulating driving device 1 to feed only the porous metal sheet 10 to the rolling roller 6, the second sintering oven 7, and the second cooling oven 8, and the skin pass roller 13. The obtained porous metal sheet 10 is wound around a roller.

Figure 7:
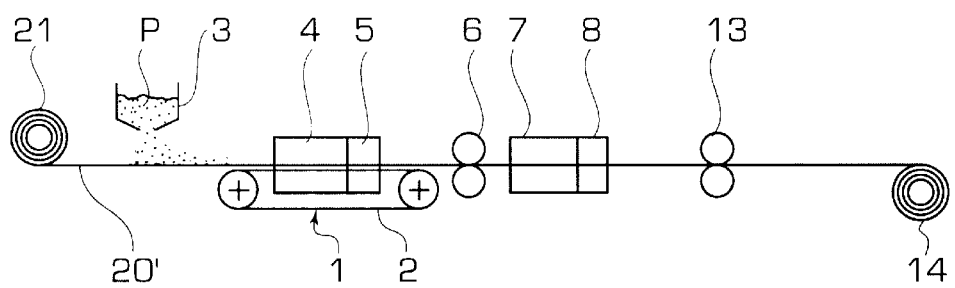
FIG. 7 is a schematic view showing an apparatus of another modification of the second embodiment.

FIG. 7 is a schematic view showing an apparatus carrying out the method according to another modification of the second embodiment. Similarly to the modification shown in FIG. 6, an inorganic supporting sheet 20' which is not removed by the heating in a sintering oven is used. The modification shown in FIG. 7 is different from that shown in FIG. 6 in that the porous metal sheet 10 formed of the metal powders is not separated from the supporting sheet 20', but fed continuously, together with the supporting sheet 20' to wind them around a roller as the coil 14. In this case, by composing the supporting sheet 20' of thin solid metal, a porous metal sheet consisting of the porous metal sheet and the solid metal sheet on which the porous metal sheet is laminated is obtained.

In the modification shown in FIG. 7, the solid metal sheet is used as the supporting sheet 20', but instead, it is possible to use a metal sheet such as a punching metal having holes formed thereon, a three-dimensional reticulate porous metal sheet, a porous fibrous metal sheet or the porous metal sheet formed by the apparatus shown in FIG. 1 as the supporting sheet 20' so as to obtain a porous metal sheet having a laminated structure.

Figure 8:
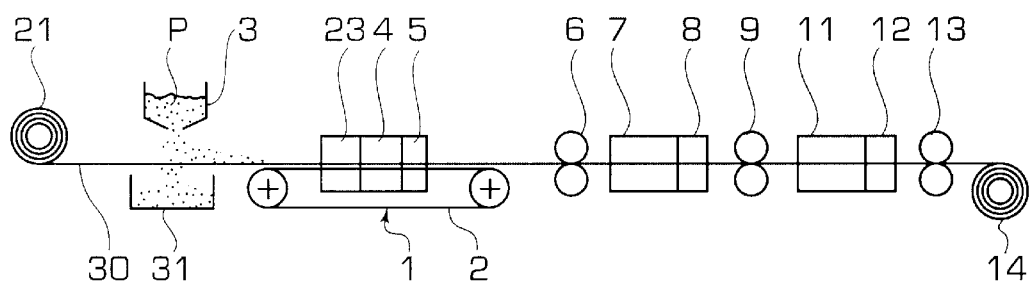
FIG. 8 is a schematic view showing an apparatus for carrying out the method of a third embodiment of the present invention.

FIG. 8 shows an apparatus for carrying out the method of the third embodiment. The third embodiment is different from the second embodiment shown in FIG. 5 in that a supporting sheet 30 which has holes formed thereon and can be burnt off is used. The process of manufacturing the porous metal sheet is similar to that of the second embodiment. Thus, the parts of the apparatus of the third embodiment are denoted by the same reference numerals as those of the apparatus of the second embodiment.

That is, as shown in FIG. 10 (A), a resinous sheet is used as the supporting sheet 30. Circular punched holes 30a are formed on the resinous sheet 30 at regular intervals lengthwise and widthwise. Therefore, when the metal powders P are spread on the supporting sheet 30 from the hopper 3, the metal powders P drop through the circular holes 30a, thus accumulating on the upper surface of the supporting sheet 30, with holes present at required pitches on the upper surface thereof.

The metal powders P which have dropped through the circular holes 30a are stored in a metal powder receiver 31 installed in confrontation with the hopper 3 to recycle them.

As described above, the metal powders P spread over the supporting sheet 30 having the holes 30a formed thereon are introduced into the resinous material-removing oven 23 installed on the feeding belt 2 of the circulating driving device 1, together with the supporting sheet 30 to burn them off at a required temperature by heating them. Then, the metal powders P are fed into the sintering oven 4 to sinter them by heating them at a required temperature.

Similarly to the second embodiment, after the metal powders P are introduced into the cooling oven 5, they are separated from the feeding belt 2, and then, rolled lightly by the rolling roller 6. Then, they are introduced into the sintering oven 7 to sinter them. Thereafter, they are treated in processes similar to those of the second embodiment.

Figure 9:
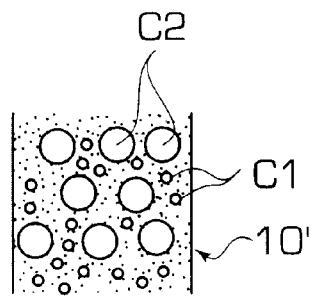
FIG. 9 is a plan view showing a porous metal sheet which is manufactured by the method of the third embodiment.
Figure 10A:
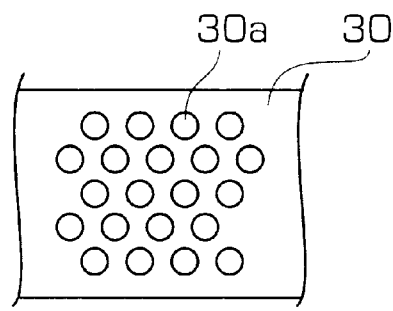
FIGS. 10 (A) through 10 (D) are plan views each showing a supporting sheet which is used in the third embodiment.
Figure 10B:
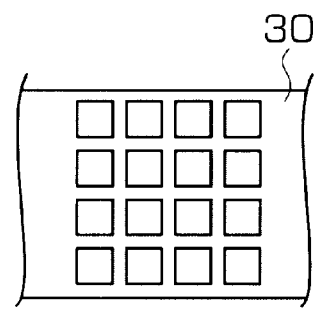
Figure 10C:
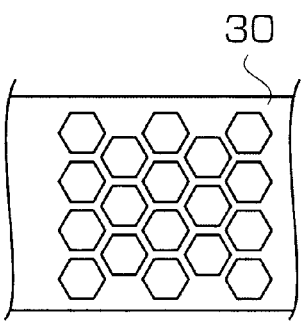
Figure 10D:
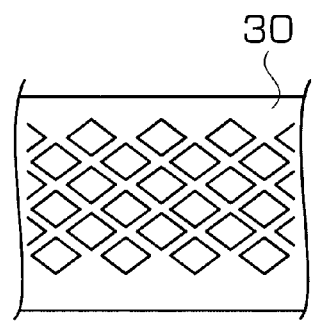

Similarly to the first and second embodiments, in the third embodiment, in the portion of a porous metal sheet 10' corresponding to the circular holes (30a)—unformed portion of the supporting sheet 30, contact surfaces of the spread metal powders are integrated with each other to form a fine porous structure, whereas in the portion thereof corresponding to the circular hole (30a)—formed portion, pores consisting of comparatively large through-holes are formed. That is, as shown in FIG. 9, it is possible to continuously manufacture the porous metal sheet 10' having two kinds of pores, namely, fine pores C1 consisting of gaps present between the adjacent metal powders P and pores C2 consisting of large through-holes corresponding to the circular holes 30a.

In the third embodiment, because the supporting sheet having circular holes shown in FIG. 10 (A) formed thereon is used, the pores C2 consisting of large holes formed on the porous metal sheet 10' are circular. But it is possible to use the supporting sheet 30 having rectangular holes formed thereon as shown in FIG. 10 (B); the supporting sheet 30 having polygonal holes formed thereon as shown in FIG. 10 (C); or the supporting sheet 30 having rhombic holes formed thereon as shown in FIG. 10 (D). In these cases, it is possible to obtain a porous metal sheet having the pores C2 consisting of large holes whose shapes correspond to the respective shapes, namely, rectangular holes, polygonal holes or rhombic holes formed thereon.

Figure 11:
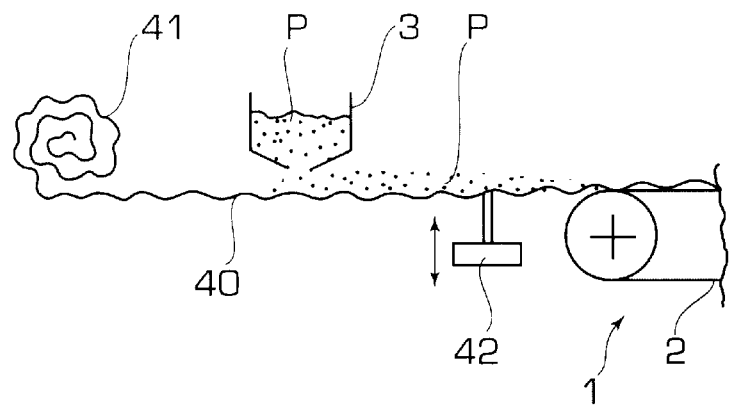
FIG. 11 is a schematic view showing an apparatus for carrying out the method of a fourth embodiment of the present invention.
Figure 12A:
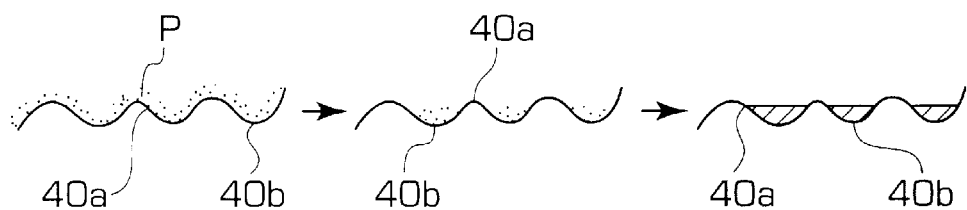
FIG. 12 (A) is a schematic view showing the principle of the method of the fourth embodiment.
Figure 12B:
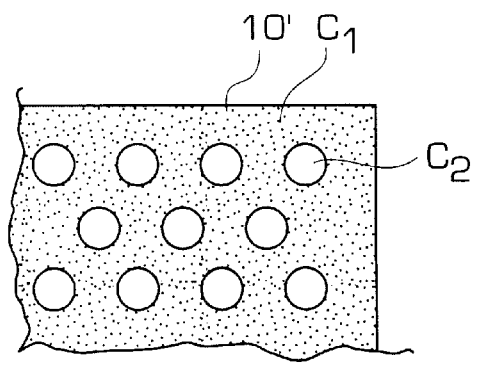

FIGS. 11 and 12 show the fourth embodiment. The fourth embodiment is different from the second embodiment shown in FIG. 5 in that a supporting sheet 40 having convexes and concaves formed thereon is used in the fourth embodiment. The manufacturing process of the fourth embodiment is similar to that of the second embodiment. Thus, the members of the apparatus of the fourth embodiment are not shown and the descriptions thereof are omitted herein.

Mountain-shaped convexes 40a are formed alternately with valley-shaped concaves 40b at regular intervals on the supporting sheet 40. Metal powders P are spread from the hopper 3 over the supporting sheet 40 having the convexes and the concaves formed thereon while it is being fed by continuously unwinding it from a coil 41.

As shown in FIG. 12 (A), the metal powders P spread over the supporting sheet 40 accumulate on the upper surfaces of the convexes 40a as well as on the surfaces of the concaves 40b. A vibration generation means 42 is installed downstream from the metal powder-spreading position to vibrate the supporting sheet 40 and drop the metal powders P accumulated on the upper surfaces of the convexes 40a to the concaves 40b.

When the metal powders P are sintered in the sintering oven, the contact surfaces of the metal powders P accumulated on the concaves 40b are integrated with each other partly to form a fine porous structure, and the portion of a resulting porous metal sheet corresponding to the convexes 40a is formed as great through-holes. That is, similarly to the structure (shown in FIG. 9) formed by the use of the porous supporting sheet 30 of the third embodiment, the porous metal sheet having fine pores C1 and the pores C2 consisting of large holes shown in FIG. 12 (B) can be manufactured.

Similarly to the supporting sheet 30 of the third embodiment having pores formed thereon, great rectangular, rhombic, and polygonal pores can be formed on the porous metal sheet by forming rectangular, rhombic or polygonal convexes on the supporting sheet 40.

Instead of the vibration generation means 42 which drops the metal powders spread over the upper surfaces of the convexes 40a to the concaves 40b, a doctor knife (not shown) may be installed over the supporting sheet 40 to forcibly scrape the metal powders P from the convexes 40a downward to the concaves 40b.

Experiment 2

Flat copper powders (average diameter: 40 $\mu$m) obtained by electrolysis were spread over the resinous supporting sheet 40 having rhombic convexes 40a formed thereon at a rate of 87 g/m$^2$. The supporting sheet 40 was vibrated by the vibration generation means 42 to move the copper powders accumulated on the convexes 40a to the concaves 40b. Then, the copper powders were placed on the feeding belt of the circulating driving device and introduced into the resinous material-removing oven, together with the feeding belt to burn off the resinous material therein at 650° C. in an atmospheric environment. Then, the metal powders P were introduced into the sintering oven to sinter them at 850° C.–950° C. in a non-oxidizing atmosphere. After they were cooled in the cooling oven, a resulting porous metal sheet was separated from the feeding belt. Then, only the porous metal sheet was fed to the rolling roller to roll them. In these processes, a porous copper sheet having large rhombic through-holes and fine pores formed thereon was obtained. The obtained porous copper sheet was 18 $\mu$m in thickness, about 46% in open area ratio, and 87 g/m$^2$ in weight.

The porous copper sheet was then sintered in the second sintering oven at 950° C. in a non-oxidizing atmosphere and cooled and then rolled again. Further, the porous copper sheet was sintered in the third sintering oven at 950° C. in a non-oxidizing atmosphere and cooled and then fed to the skin pass roller.

The porous copper sheet manufactured in the processes was 17 $\mu$m in thickness, 45% in open area ratio, and 83 g/m$^2$ in weight. The porous copper sheet was elongated by about 5% lengthwise by the rolling.

In the third embodiment, pore-formed supporting sheet is used. In the fourth embodiment, the supporting sheet having convexes and concaves formed thereon is used. Both in the third and fourth embodiments, the resinous sheet which can be burnt off is used. But a sheet may be formed of an inorganic substance such as a metal sheet. Further, in spreading metal powders directly on the feeding belt of the circulating driving device, it is possible to use a hole-formed feeding belt or a convexes/concaves-formed feeding belt to manufacture a porous metal sheet having through-holes, as in the case of the first embodiment.

FIGS. 13 and 14 show the fifth embodiment. A sublimable fine fragment is mixed with metal powders. When an apparatus similar to that of the first embodiment is used, the mixture is spread on a feeding belt of a circulating driving device of belt conveyor type. When an apparatus similar to that of the second through fourth embodiments is used, the mixture is spread on a supporting sheet.

As the sublimable fine fragment, a resinous spherical material (so-called bead-shaped material), a resinous cubic material, a resinous rectangular solid-shaped material or resinous ultra-fine particles which are burnt off by heating is used.

As shown in FIG. 13 (A), in the fifth embodiment, a hopper 3 storing metal powders P and a hopper 51 storing a sublimable fine fragment 50 are installed above a mixing hopper 52. Similarly to the hopper 3 of the first embodiment, the mixing hopper 52 is located above the feeding belt 2 of the circulating driving device 1. An agitator 53 for mixing the metal powders P and particles of the sublimable fine fragment 50 with each other substantially uniformly is provided inside the mixing hopper 52.

The metal powders P and the particles of the sublimable fine fragment 50 are mixed with each other, and then, the mixture is spread on the upper surface of the feeding belt 2 of the circulating driving device 1. Then, the mixture is introduced into the resinous material-removing oven 23 and the sintering oven 4, together with the feeding belt 2 to heat it. As a result, the particles of the sublimable fine fragment 50 sublimates and thus as shown in FIG. 14, the portions of a resulting porous metal sheet in which the particles of the sublimable fine fragment 50 has been present are formed as pores C3. Unlike the pores C2 consisting of large holes of the third and fourth embodiments, the pores C3 of the fifth embodiment consist of not only through-holes, but also pores present randomly in the thickness direction of a resulting porous metal sheet 10". Further, the contact surfaces of the metal powders P surrounding the pores C3 formed by the sublimation of the particles of the sublimable fine fragment 50 are connected with each other. Thus, the porous metal sheet 10" having the fine pores C1 and the comparatively large pores C3 formed by the sublimation of the particles of the sublimable fine fragment 50 is formed.

The pores C3 having various sizes can be formed by changing the size of the particles of the sublimable fine fragment 50. Further, the pores C3 having various sizes and shapes can be easily formed by mixing the particles of the sublimable fine fragment 50 having different sizes and shapes with the metal powders P.

Needless to say, it is preferable to cool the porous metal sheet after the particles of the sublimable fine fragment 50 are burnt off and the metal powders P are sintered and then, rolled and then, sintering and cooling are repeated, similarly to the first through fourth embodiments.

As shown in FIG. 13 (B), the hopper 51 storing the sublimable fine fragment 50 may be installed at the upstream side of the feeding belt 2, and the hopper 3 storing the metal powders P may be installed downstream from the hopper 51 so that after the particles of the sublimable fine fragment 50 are spread on the feeding belt 2, the metal powders P are spread thereon. In this case, the metal powders P are spread in the gaps between adjacent particles of the sublimable fine fragment 50. Thus, the metal powders P and the particles of the sublimable fine fragment 50 are mixed with each other, similarly to the result obtained by the construction shown in FIG. 13 (A).

By applying metal powders and the particles of the sublimable fine fragment 50 to the porous supporting sheet used in the third embodiment or the supporting sheet of the fourth embodiment having the convexes and concaves formed thereon, it is possible to obtain a porous metal sheet having three kinds of pores, namely, large through-holes formed by means of the supporting sheet, intermediate pores formed by the sublimation of the sublimable fine fragment 50, and fine pores formed in contact portions of adjacent metal powders.

Figure 15:
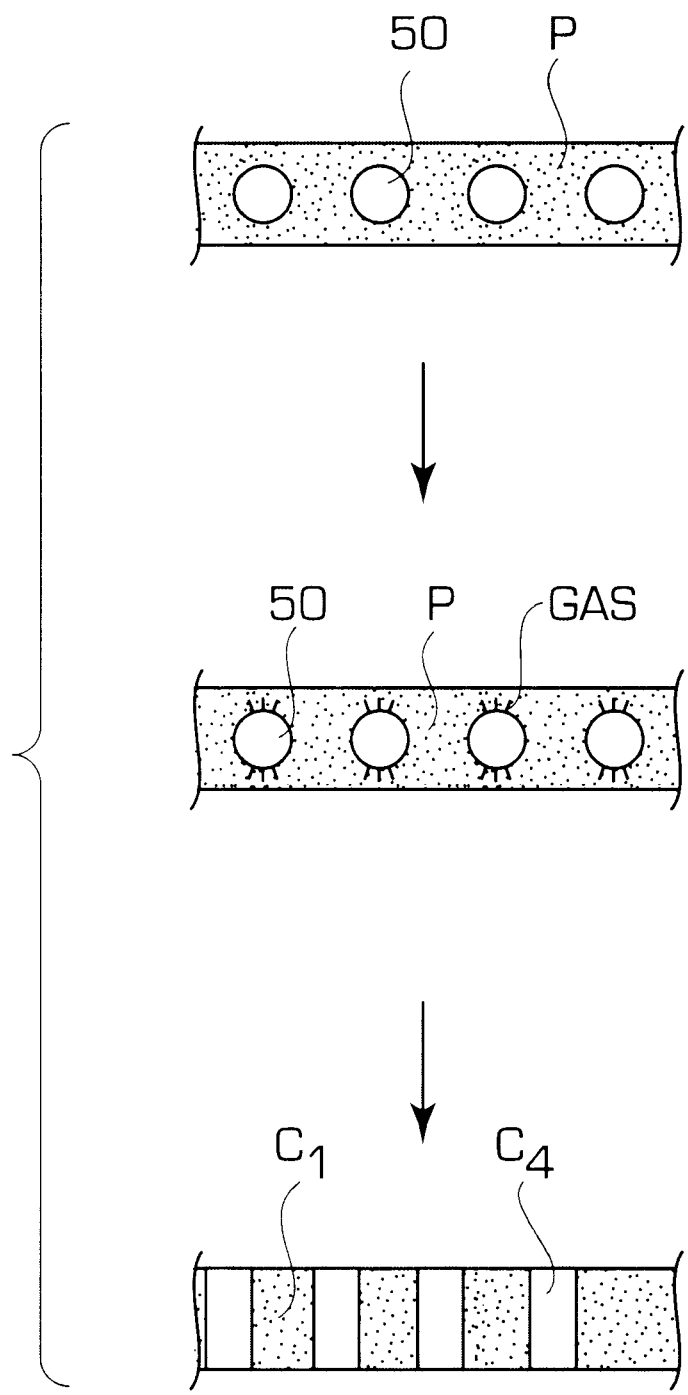
FIG. 15 is a schematic sectional view showing a through-hole-forming process of a modification of the fifth embodiment.

When some agent such as foaming agent decomposed to generate gas by heating is used as the sublimable fine fragment 50, through-holes are formed by the generated gas. That is, as shown in FIG. 15 (A), by mixing the sublimable fine fragment 50 consisting of comparatively large particles with the metal powders P, gas is generated when the mixture is heated, as shown in FIG. 15 (B). As a result, through-holes C4, namely, pores penetrating a resulting porous metal sheet vertically are formed in the portion where the sublimable fine fragment 50 has been present, as shown in FIG. 15 (C). In this case, similarly to the third and fourth embodiments, a porous metal sheet having pores consisting of comparatively large through-holes and fine pores is obtained.

Experiment 3

90 parts by weight of flat copper powders (average diameter: 40 $\mu$m) obtained by electrolysis and 10 parts by weight of sublimable fine fragment (particle diameter: 15 $\mu$m–20 $\mu$m) were mixed with each other. The mixture was spread on the feeding belt 2 at a rate of 100 g/m². The mixture was heated at 950° C. in the sublimable fine fragment-removing/sintering oven in a hydrogen atmosphere to vaporize the sublimable fine fragment and sinter the copper powders. Then, the copper powders were cooled in the cooling oven 5, and a resulting porous copper sheet was separated from the feeding belt 2. Then, the porous copper sheet was rolled. The obtained porous copper sheet was 12.8 $\mu$m in thickness; 15.8% in open area ratio; 99 g/m² in weight.

The porous copper sheet has through-holes having diameters 20 $\mu$m–30 $\mu$m formed on the entire surface thereof. The porous copper sheet is contracted at about 10% in the width direction of porous copper sheet by the sintering. The porous copper sheet is oxidized and useless if the sublimable fine fragment is removed from the porous copper sheet in atmospheric environment. Thus, foaming agent was vaporized during the sintering operation to remove the sublimable fine fragment.

The porous copper sheet was sintered again in the sintering oven at 950° C. in a hydrogen atmosphere and rolled again. Then, the porous copper sheet was sintered in the third sintering oven at 950° C. in a hydrogen atmosphere and then passed through the skin pass roller to reduce its thickness to 11.6 $\mu$m, the open area ratio to 8.0%, the weight to 95 g/m².

Figure 16:
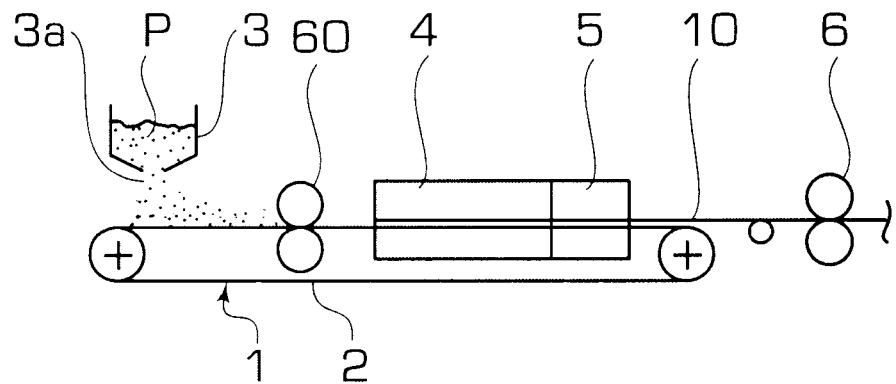
FIG. 16 is a schematic view showing an apparatus for carrying out the method of a sixth embodiment of the present invention.

FIG. 16 shows an apparatus for carrying out the method of the sixth embodiment. In the sixth embodiment, metal powders P are spread on a feeding belt 2 of a circulating driving device 1 by a hopper 3. Then, the metal powders P are pressed at a small force by a pressing roller 60 installed on the feeding belt 2. The pressing roller 60 is used not to compress the metal powders P but increase the contact area thereof.

The integrated surface of the metal powders P and the strength of a resulting porous metal sheet can be increased by sintering the metal powders P in the sintering oven 4 after they are pressed lightly by the pressing roller 60.

Figure 17:
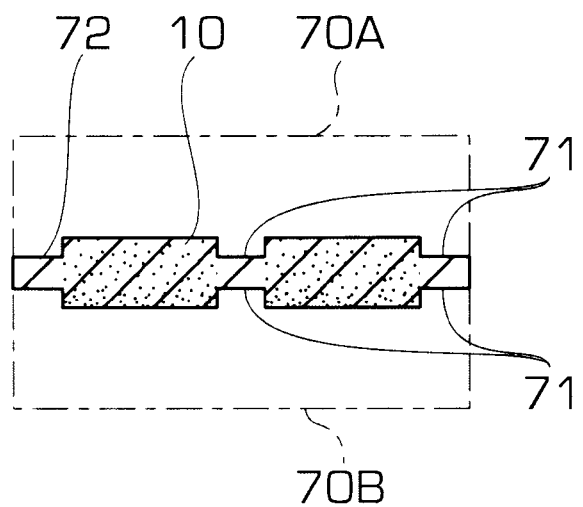
FIG. 17 is a schematic sectional view showing main portions of an apparatus for carrying out the method of a seventh embodiment of the present invention.

FIG. 17 shows an apparatus for carrying out the method of the seventh embodiment. In the seventh embodiment, before a porous metal sheet 10 manufactured in previous processes is passed between a pair of skin pass rollers, it is passed between lead portion-forming rollers 70A and 70B. A convex 71 is formed on the rollers 70A and 70B at both ends and the center thereof in the lengthwise (axial) direction thereof such that the convex 71 of the roller 70A and that of the roller 70B are radially spaced at a predetermined interval and coincident with each other in the lengthwise (axial) direction thereof. Thus, when the porous metal sheet 10 is passed between the rollers 70A and 70B, fine pores of the portion of the porous metal sheet 10 are crushed by the pressing force of the upper and lower convex 71. As a result, the crushed portion of the porous metal sheet 10 becomes solid. The solid portion of the porous metal sheet 10 is used as a lead portion 72. When the porous metal sheet 10 is used as an electrode substrate of a battery, the lead portion 72 performs an electric current collecting function.

The present invention is not limited to the embodiments, but it is possible to use the manufactured porous metal sheet as a supporting sheet so that metal powders are spread on the supporting sheet and the porous metal sheet is repeatedly used until the porous metal sheet has a desired thickness and strength.

Figure 18:
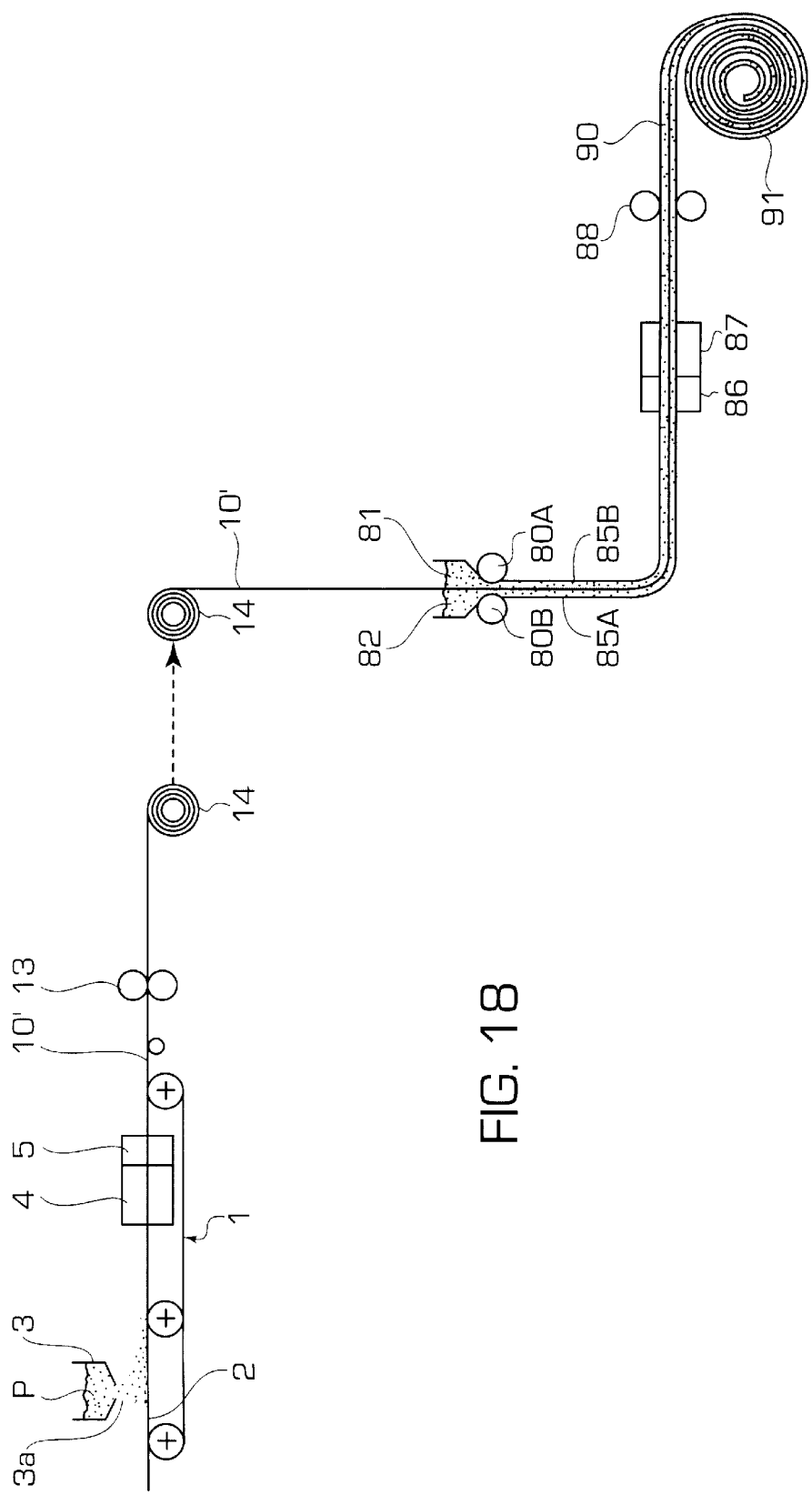
FIG. 18 is a schematic view showing the method of an eighth embodiment.
Figure 19:
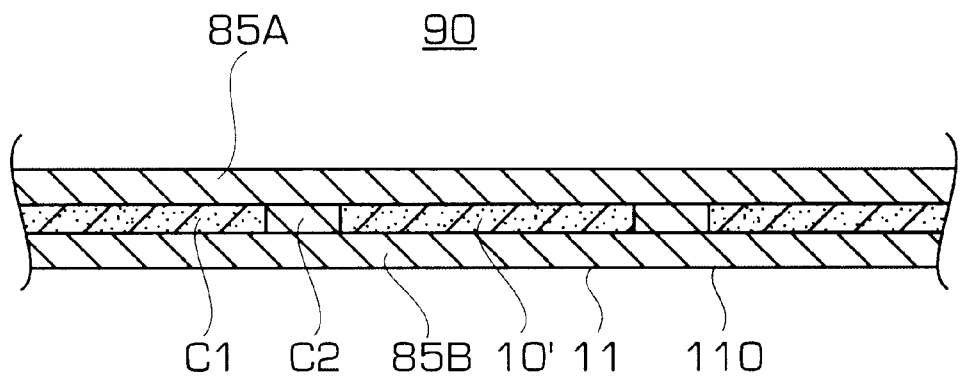
FIG. 19 is an enlarged view of an electrode manufactured by the method of the eighth embodiment.

FIGS. 18 and 19 show an eighth embodiment. In the eighth embodiment, electrodes are successively formed by supplying an active substance, for example, an active substance containing hydrogen-storing alloy powder as the main component to a porous metal sheet 10' which has a great pore C2 and a fine pore C1 and which is formed by the method of the fourth embodiment shown in FIG. 11.

That is, the porous metal sheet 10' is passed between a pair of skin pass rollers 13 for tempering and wound as a coil 14. The porous metal sheet 10' fed out from the coil 14 is successively guided vertically to a hopper 81 positioned above rollers 80A and 80B positioned at both sides of the porous metal sheet 10'. Powder (for example, mixed powder of hydrogen-storing alloy powder and nickel powder) 82 of an active substance stored inside the hopper 81 are supplied to both surfaces of the porous metal sheet 10' and between the rollers 80A and 80B.

The supplied mixed powder 82 is filled into the pores C2 and C1 of the porous metal sheet 10' and fixedly attached to both surfaces of the porous metal sheet 10' by the pressing force of the rollers 80A and 80B to form active substance layers (for example, layer of hydrogen-storing alloy powder) 85A and 85B having a required thickness, respectively.

Then, the porous metal sheet having the active substance layers 85A and 85B is passed through a sintering oven 86 to sinter them in a non-oxidizing atmosphere and then passed through a cooling oven 87 for cooling and finally, passed between a pair of skin pass roller 88 for tempering at a required load. An electrode (for example, a hydrogen-storing alloy electrode) 90 thus formed as shown in FIG. 19 is successively wound as a coil 91.

Experiment 4

In a nickel porous metal sheet 10' rolled by the skin pass roller 13, the diameter of the great pore C2 was 1.8 mm; open area ratio was 47.0%; and thickness was 25 $\mu$m. A mixed powder 82 which was supplied to the porous metal sheet 10' was prepared by mixing 18 parts by weight of hydrogen-storing alloy powder of $AB_2$ type having a powder diameter of 60–80 $\mu$m with two parts by weight of nickel powder having an average powder diameter of 2.5 $\mu$m. The mixed powder 82 was supplied to both surfaces of the porous metal sheet 10' at 540 g/m² on each surface. Then, the porous metal sheet 10' was pressurized by the rollers 80A and 80B of $\phi$150 mm at a load of five tons for rolling at a line speed of 1 m/min. Then, the rolled porous metal sheet 10' was sintered in the sintering oven 86 having a non-oxidizing atmosphere at 950° C. for two minutes. Finally, the sintered porous metal sheet 10' was rolled by the skin pass roller 88 at a load of five tons to make the electrode 90 of the hydrogen-storing alloy having a thickness of 0.18 mm.

In the electrode 90 of the hydrogen-storing alloy manufactured as described above, because binder is not added thereto, the flow of electric current was not inhibited. Further, because nickel powder was added instead of carbon conventionally used as electrically conductive material, the electrode 90 had a high degree of electricity-collecting property.

A method of manufacturing electrodes such as an electrode of the hydrogen-storing alloy successively after manufacturing the porous metal sheet is not limited to the above-described method. That is, it is possible to successively manufacture electrodes by charging an active substance into a metal sheet fed successively without coiling or charging an active substance into the metal sheet fed with uncoiling similarly to the seventh embodiment after performing the method of the first, second, third, fifth, and sixth embodiment. Further, it is possible to mix other transition metals, for example, copper powder for the hydrogen-storing alloy powder instead of nickel powder. In addition, transition metals such as nickel powder, copper powder and so on may be mixed with the hydrogen-storing alloy powder. Further, only the hydrogen-storing alloy powder may be used as a simple substance. The shape of the transition metal is not limited to the shape of powder.

Experiment 5

A nickel porous metal sheet 10" having a thickness of 25 $\mu$m and open area ratio of 35% was prepared by the method of the fifth embodiment shown in FIG. 13. Hydrogen-storing alloy powder of $AB_5$ type as similar to experiment 4 was supplied to both surfaces of the porous metal sheet. Then, it was pressurized at a load of five tons, and then sintered in a sintering oven having a non-oxidizing atmosphere at 950° C. for two minutes. Finally, the sintered porous metal sheet was tempered by using a skin pass roller to form an electrode of the hydrogen-storing alloy having a thickness of 0.18 mm. In experiment 5, after the nickel porous metal sheet 10" was prepared by the method of the fifth embodiment, it was not wound as a coil but the hydrogen-storing alloy powder was supplied to the porous metal sheet 10" while it was being fed successively.

In the electrode of the hydrogen-storing alloy thus prepared, because the porous metal sheet has pores formed by a sublimable fine fragment and fine pores between metal powders, the pores were filled with the hydrogen-storing alloy powder. Further, a thin layer of the hydrogen-storing alloy powder was reliably fixed to both surfaces of the metal sheet by the sintering and the pressure application by means of the skin pass roller.

Figure 20:
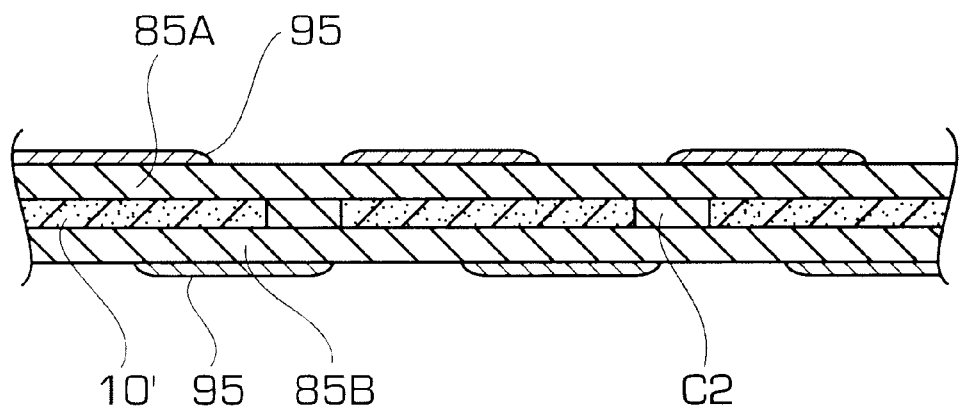
FIG. 20 is an enlarged sectional view of an electrode manufactured by a modified method of the eighth embodiment.

It is possible that after the hydrogen-storing alloy powder is supplied to the porous metal sheet to fill the pores and both surfaces thereof with the hydrogen-storing alloy powder as described above, powder of a transition metal such as nickel powder is supplied to the surface of the hydrogen-storing alloy layers 85A and 85B at both sides of the porous metal sheet to form a transition metal layer 95 as shown in FIG. 20. The hydrogen-storing alloy powder can be held at a high strength by providing the transition metal layer 95.

The metal which is supplied to the surface of the hydrogen-storing alloy layers 85A and 85B is not limited to nickel powder, but a transition metal such as copper powder or mixed transition metal powder such as nickel powder, copper powder and so on may be used. Further, the hydrogen-storing alloy layers 85A and 85B may be formed on only one surface of the porous metal sheet.

Experiment 6

While a porous copper sheet (thickness: 17 $\mu$m, open area ratio: 45%) obtained in experiment 2 was being successively fed, a paste active substance obtained by suspending a mixture of 100 parts by weight of mesophase graphite and five parts by weight of styrene butadiene rubber in an aqueous solution of carboxymethylcellulose was applied to both surfaces of the porous copper sheet and was then dried. Then, the porous copper sheet was rolled to form an electrode having a thickness of 0.2 mm.

As described in experiment 6, not only an electrode of the hydrogen-storing alloy but also an electrode which is used as the negative electrode of a lithium secondary battery can be formed by forming a porous metal sheet which is used as an electrode substrate and supplying the active substance thereto while it is being fed successively after it is unwound or without winding it as a coil.

As apparent from the foregoing description, according to the present invention, metal powders are spread densely and directly on the feeding belt of the circulating driving device or the supporting sheet which is placed on the feeding belt. Then, the metal powders pass through a sintering oven to sinter them without rolling them, with adjacent metal powders in partial contact with each other. Therefore, contact portions of the metal powders are fused together, and gaps between the adjacent metal powders remain as fine pores. Therefore, a porous metal sheet having a large number of the fine pores can be continuously formed.

When a pore-formed sheet or a concave/convex-formed sheet is used as the supporting sheet, portions corresponding to the pores or the convexes are formed as through-holes. Thus, a porous metal sheet having fine pores formed between metal powders and comparatively large through-holes can be continuously formed.

Pores can be formed in portions where particles of a sublimable fine fragment have been present by spreading a mixture of the sublimable fine fragment and metal powders on a feeding belt or a supporting sheet. Consequently, it is possible to form three-dimensional pores having a required size corresponding to the size of particles of the sublimable fine fragment. Accordingly, a porous metal sheet having fine pores formed between metal powders and comparatively large pores formed by the sublimation of particles of the sublimable fine fragment can be continuously formed. Further, a porous metal sheet having pores of various sizes including through-holes can be continuously formed by using the pore-formed sheet or the concave/convex-formed sheet.

As described above, it is possible to form fine pores, through-holes, and three-dimensional pores or in combination thereof. Thus, it is possible to provide an electrode substrate comprising a preferable porous metal sheet corresponding to the kind of a battery. That is, the porous metal sheet of the present invention can be preferably used as an electrode substrate of a nickel hydrogen battery, a nickel cadmium battery, a lithium primary battery, a lithium secondary battery, an alkali dry cell, a fuel cell; and an electrode plate of a battery for vehicles.

Further, a battery electrode such as an electrode of a hydrogen-storing alloy can be successively manufactured by supplying powders of an active substance such as the hydrogen-storing alloy powder to a porous metal sheet after it is successively formed of metal powders. That is, the present invention can enhance the productivity of an electrode dramatically because the porous metal sheet and the electrode formed of the metal sheet composing the substrate thereof can be manufactured successively.

Further, in the battery electrode of the present invention, because binder is not added to the active substance, the amount of the active substance can be increased by that much and electricity-collecting property can be improved. More specifically, the amount of the active substance can be increased by about 7% in correspondence to the amount of the binder which is conventionally added thereto. Furthermore, the electricity-collecting property can be enhanced and the performance of the battery can be improved by 5–10% by adding transition metal such as nickel powders or copper powders to the active substance, instead of carbon which is conventionally used as an electrically conductive material.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a porous metal sheet comprising the steps of:

spreading metal powders on a feeding belt which is continuously fed;

passing the feeding belt on which the metal powders have been spread through a sintering oven; and sintering the metal powders, with adjacent uncompressed metal powders in contact with each other partly and gaps present therebetween so as to integrate contact portions of the metal powders with each other and form the gaps as fine pores, wherein a sheet having convexes and concaves formed alternately with each other is used as the feeding belt so that metal powders which have been spread on the convexes are dropped to the concaves by vibrating the metal powders or by a scraping means and then sintered in a sintering oven so as to form fine pores between the adjacent metal powders and pores consisting of large through-holes corresponding to the convexes.

2. The method according to claim 1, wherein the feeding belt comprises a solid metal sheet, an inorganic sheet including a porous metal sheet or a laminated sheet composed of the solid metal sheet, and the inorganic sheet including a porous metal sheet; and the feeding belt is a conveyor belt of a circulating driving device.

3. The method according to claim 1, wherein pores of a porous sheet which is used as the feeding belt are circular, rhombic, polygonal or elliptic.

4. A method of manufacturing a porous metal sheet comprising the steps of:

feeding a supporting sheet continuously;

spreading metal powders on the supporting sheet;

feeding the supporting sheet on which the metal powders have been spread on a feeding belt; and passing the supporting sheet through a sintering oven, together with the feeding belt; and sintering the metal powders on the supporting sheet, with adjacent uncompressed metal powders in contact with each other partly and gaps present therebetween so as to integrate contact portions of the metal powders with each other and form the gaps as fine pores.

5. The method according to claim 4, wherein the supporting sheet is burnt off in a resinous material-removing oven.

6. The method according to claim 4, wherein the supporting sheet comprises an organic sheet including a solid resinous sheet, a three-dimensional reticulate resinous sheet and a porous fibrous resinous sheet, an inorganic sheet including a solid metal sheet and a porous metal sheet or a laminated sheet composed of a plurality of sheets selected from the sheets.

7. The method according to claim 4, wherein a sheet having convexes and concaves formed alternately with each other is used as the feeding belt or the supporting sheet, so that metal powders which have been spread on the convexes are dropped to the concaves by vibrating the metal powders or by a scraping means and then sintered in a sintering oven so as to form fine pores between the adjacent metal powders and pores consisting of large through-holes corresponding to the convexes.

8. The method according to claim 4, wherein pores of a porous sheet which is used as the feeding belt and the supporting sheet are circular, rhombic, polygonal or elliptic.

9. The method according to claim 1, wherein after the metal powders are sintered and cooled, the resulting porous metal sheet is passed between a pair of rolling rollers to increase an area of connected portions of the metal powders so as to increase the strength of the porous metal sheet.

10. The method according to claim 4, wherein after the metal powders are sintered and cooled, the resulting porous metal sheet is passed between a pair of rolling rollers to increase an area of connected portions of the metal powders so as to increase the strength of the porous metal sheet.

11. The method according to claim 1, wherein after the metal powders are sintered, cooled, and rolled, the resulting porous metal sheet is separated from the feeding belt.

12. The method according to claim 4, wherein after the metal powders are sintered, cooled, and rolled, the resulting porous metal sheet is separated from the feeding belt or the supporting sheet.

13. The method according to claim 1, wherein after the metal powders are spread on the feeding belt, the metal powders are pressed at a required small pressure by a pressing roller, and then, the metal powders are passed through the sintering oven to sinter the metal powders.

14. The method according to claim 4, wherein after the metal powders are spread on the feeding belt or the supporting sheet, the metal powders are pressed at a required small pressure by a pressing roller, and then, the metal powders are passing through the sintering oven to sinter the metal powders.

15. The method according to claim 1, wherein a sublimable fine fragment which is burnt off by heating is mixed with the metal powders or spread on the feeding belt before the metal powders are spread thereon, and the sublimable fine fragments are burnt off in a resinous material-removing oven to form fine pores between the adjacent metal powders and large pores formed in portions where the sublimable fine fragment has been present.

16. The method according to claim 4, wherein a sublimable fine fragment which is burnt off by heating is mixed with the metal powders or spread on the feeding belt or the supporting sheet before the metal powders are spread thereon, and the sublimable fine fragment are burnt off in a resinous material-removing oven to form fine pores between the adjacent metal powders and large pores formed in portions where the sublimable fine fragment has been present.

* * * * *